Figure 1:
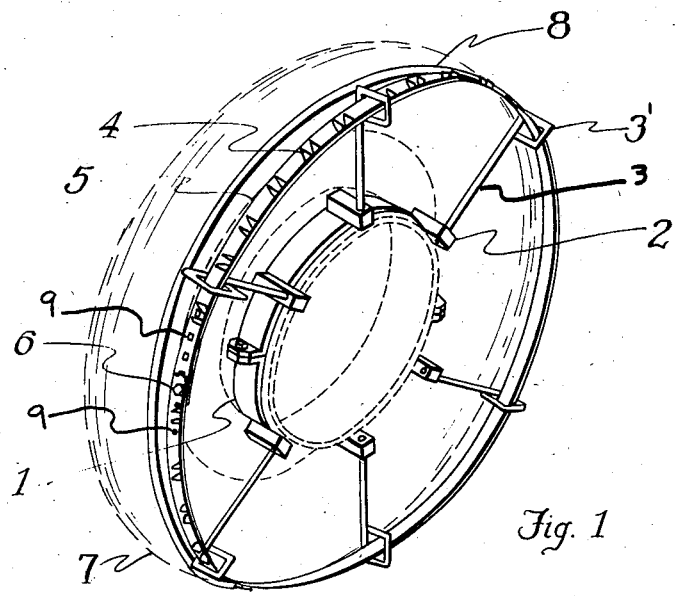

June 8, 1937.  H. H. FULLER  2,083,367

SPRING TRACTION WHEEL

Filed June 30, 1936

HARRY H. FULLER
INVENTOR

ATTORNEYS

Patented June 8, 1937

2,083,367

UNITED STATES PATENT OFFICE 2,083,367

SPRING TRACTION WHEEL

Harry H. Fuller, Madison, Wis.

Application June 30, 1936, Serial No. 88,198

9 Claims. (Cl. 301—47)

This invention relates to traction wheels, and in particular to a traction wheel that is resilient.

One of the objects of the invention is to provide a device suitable for engaging and gripping surfaces such as are presented by various roads under varying conditions. The device is particularly adapted for use in conjunction with vehicles, especially automotive vehicles, to provide circumferential traction over slippery or loose surfaces. In addition, the invention is intended to provide a device which exerts a resistance to axial slipping or skidding.

This invention is also intended to provide an inexpensive traction wheel which can be readily applied to or removed from any vehicle, and whose individual parts are easily replaceable.

Another purpose of the invention is to provide a device whose tension or pressure against a slippery surface can be varied or which, by further adjustment, may be lifted from or applied to that surface. It is also an object to arrange the device so that these results may be obtained through simple adjustment by manipulation of a single screw or screws or other device.

Although spring traction wheels are old, spring traction wheels or spring auxiliary wheels heretofore constructed have not been arranged with a resilient band attached to resilient spokes by means of eyes at the radial ends of the spokes.

A further object of this invention, then, is to provide a spring traction wheel with a resilient rim, or traction band, which is connected with resilient radial arms, or spokes, by eyes at the ends of the arms. These eyes are particularly adapted to allow the rim to shift its position freely to a limited degree in its circumferential relation to the supporting arms. Herein lies the advantage that the strain from contact between the wheel and the slippery surface is distributed to all component resilient parts of the wheel. These eyes, in addition to holding the rim, also provide traction when the wheel sinks into loose surfaces by acting as paddles.

Rigid annular rings have often been used in conjunction with spring wheels as auxiliary supports to the main wheels of automobiles in case of tire trouble. However, such rings have not been used to provide additional rigidity, uniform shape and position, and to distribute strain to the various parts of a spring wheel.

This invention is, accordingly, intended to provide a spring traction wheel which can be used with an attached rigid annular ring. This ring is particularly adapted to give rigidity to the various resilient members, keep them in relatively uniform positions, distribute strains throughout the wheel and, conversely, transmit the resistance to stress of each of the spring members to the point of contact with the road. But whether used with the rigid annular ring or not, this wheel, in addition to increasing traction, is especially useful as emergency support in case of tire trouble because of the similarity of its axle-supporting characteristics to those of a pneumatic tire.

While studs have long been used on rims of spring traction wheels for the single purpose of increasing traction, it is not believed that studs have ever been used on such rims for that and the additional purpose of engaging the eyes of radially extending arms, thus preventing further movement of the rim through the eyes. It is thus another object of this invention to provide a spring wheel with studs to increase traction. But a co-purpose of these studs is to engage the eyes of the radial arms and thus prevent slipping of the rim through the eyes beyond the point of contact between the eyes and the studs.

Figure 2:
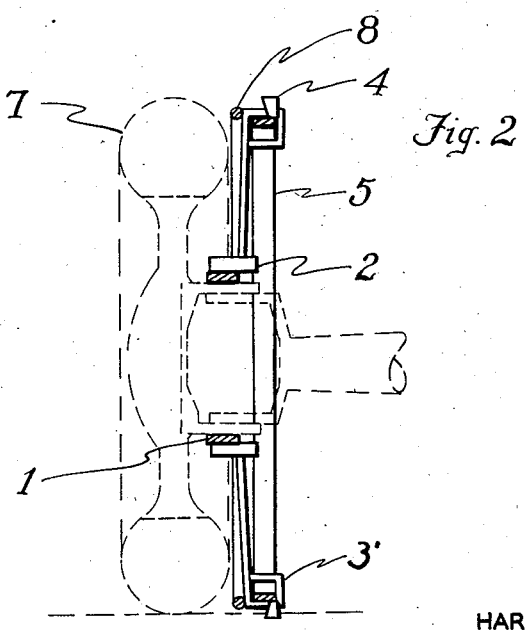

In order that my device may be more clearly understood, the preferred construction of the same is described by reference to various figures in the attached drawing, with the understanding that similar reference numerals are applied to like parts throughout various figures, and in which:

Fig. 1 is a view in perspective of the preferred form of the invention when mounted on an auto wheel, Fig. 2 is a front view of the same shown in section.

The device comprises a band 1 which may be clamped or otherwise fixedly secured on the brake drum of the wheel or on some other part which rotates with the wheel and its driving shaft. On this band are secured, by welding or in any other suitable manner, blocks 2 which extend inwardly from the band. Fixed in the blocks 2 are radially extending arms 3 of resilient material, the ends of these arms being bent around to form eyelets 3'. The length of the arms is such that the outer portions of these eyelets are located slightly inwardly of the line of the outer periphery of the wheel, so that in operation these eyelets themselves do not touch the ground when the vehicle is driven.

The ground engaging member consists of a band 5 of resilient flexible material such as steel. This band is arranged within the eyelets 3'. On the outer surface of the band are arranged lugs or gripping members 4, preferably provided in pairs at spaced intervals along the length of the band. The band is adjustable in length by means of a plurality of apertures 9 provided in its two ends, through which passes a bolt 6. By changing the apertures through which the bolt passes the circumferential length of the band can be modified.

The dimensions of the parts are such that the radial width of the openings in the eyelets 3' is slightly greater than the sum of the thickness of the band 5 and the height of the lugs 4. The purpose of this is to permit the band and lugs to slide through the eyelets so that the band may be removed from the eyelets. The length of the band is such that by adjustment of the screw 6 it may be arranged either so that it contacts at all points with the outer portions of the eyelets or so that it is contracted so as to contact with the inner portions of the eyelets.

In order to avoid damage to the mechanism described above, and also in order to prevent injury to the occupants of the vehicle if the tire 7 on the wheel should be deflated, I provide around the band a rigid ring 8 which is secured to the arms 3 by welding or in any other suitable fashion. Of course this ring might be secured to any other part of the wheel assembly.

The operation of the device just described is as follows: During normal driving, the band is contracted by suitable adjustment so that the lugs 4 lie inside the periphery of the tire 7. The tire 7 then drives the vehicle in the usual manner, and the lugs do not come into action. If, however, the vehicle is being driven on ice or snow, or other slippery conditions, the band is adjusted so that the lugs 4 extend more or less beyond the periphery of the tire, depending on the holes 9 in which the bolt 6 is engaged. If the tire grips the ground and drives the vehicle, the weight of the vehicle merely flexes inwardly the lower portion of the band 5. If, however, the tire should begin to slip, the lugs 4 will engage the surface and cause the vehicle to move.

It is evident that the lugs 4 are not rigidly connected with the wheel, but that a certain amount of play is permitted therebetween. To begin with, the band 5 is able to slide to a certain limited extent in the eyelets 3 because of the spacing between the pairs of lugs 4. Furthermore, the resilience of the arms 3 provides a certain amount of additional play. Therefore, a sudden effort to start the wheel turning does not impart a shock such as would be likely to break the mechanism, but the resilience of the play permits this sudden movement to be gradually taken up. For this reason the device is capable of withstanding hard usage without breaking or wearing out. The rim 8 also imparts a certain amount of rigidity, while permitting the play described above.

Since resilience of all the spring members of the wheel is applied to the point of contact with the slippery surface, vertical adjustment to roughness is absorbed by the spring members, and thus easy riding as well as constant traction occurs. Since circumferential resilience is inherent in this wheel, there results a constantly self-equalizing relationship between the power applied to the wheel and the traction derived therefrom.

One of the great advantages of this wheel over other traction devices is that it can be mounted when used on an automobile, separate from and independent of the tire. The pressure which it exerts against the road or other surface, then, does not directly depend upon the weight supported by that tire, nor can it injure the tire.

Though I have described the preferred form of my invention, I do not limit myself to the specific form described and shown, but reserve the right to make all changes falling within the spirit of my invention and the scope of the appended claims.

What I claim is:

1. A traction wheel comprising a ring adapted to be secured to the driving wheel of a vehicle, a plurality of radially extending resilient arms carried by said ring, the ends of said arms being bent around to form eyelets, a resilient member passing through said eyelets, said member having spaced lugs on its outer side, said lugs being arranged in pairs and said eyelets encircling said member between pairs of said lugs, at least one end of said member having a plurality of apertures therein, and at least one bolt engageable in said apertures and passing through the other end of the member for adjusting the length of the member.

2. A traction wheel comprising a ring adapted to be secured to the driving shaft of a vehicle, a plurality of radially extending resilient arms carried by said ring, the ends of the said arms being bent around to form eyelets, a resilient band passing through said eyelets, said band having spaced lugs on its outer side, said lugs being arranged in pairs and said eyelets encircling said band between pairs of said lugs, at least one end of said band having a plurality of longitudinally spaced apertures therein, and at least one bolt selectably engageable in said apertures passing through the other end of the band for adjusting the length of the band.

3. A traction wheel comprising a band, means to connect said band to the brake drum of the vehicle, a plurality of radially extending resilient arms carried by said band, the ends of said arms being bent around to form eyelets, a resilient member passing through said eyelets, said member having gripping lugs projecting from the periphery thereof, and a rigid ring secured to the said eyelets.

4. A traction wheel comprising a ring adapted to be secured to the driving wheel of the vehicle, a plurality of radially extending resilient arms carried by said band, the radial ends of said arms forming eyelets, a resilient continuous band passing through said eyelets, and lugs to prevent said resilient band from normally slipping through said eyelets.

5. A traction wheel substantially as described in claim 4, said lugs being of suitable size and shape to pass through said eyelets by manual operation, and being of such extent as to prevent said resilient band from slipping through said eyelets when in operation under vehicular power.

6. A traction wheel as claimed in claim 3, said rigid ring being rigidly attached to said radially extending arms adjacent the outer ends thereof and extending in circumferential direction therebetween, whereby strain on any single arm is distributed to all of said arms.

7. A traction wheel comprising means for securing said traction wheel to the driving shaft of a vehicle, said means including a plurality of resilient arms, an eyelet rigidly attached to the end of each of the said arms, and a continuous resilient member passing through the said eyelets, said member having a plurality of lugs projecting from the periphery thereof so as to increase the traction of said wheel when the latter is brought into engagement with road surface, and to engage said eyelets to and limit the slipping of said member with relation to said arms.

8. A traction wheel comprising means for securing said traction wheel to the driving shaft of a vehicle, said means including a plurality of resilient arms, an eyelet rigidly attached to the end of each of the said arms, and a continuous resilient member passing through the said eyelets, said band having a plurality of lugs projecting from the periphery thereof so as to increase the traction of said wheel when the latter is brought into engagement with road surface, and to engage said eyelets and so limit the slipping of said band with relation to said arms, and means for adjusting the circumference of said continuous resilient band.

9. A traction wheel comprising a plurality of eyelets, means for attaching said eyelets to the driving shaft of a vehicle, a continuous member passing through said eyelets, and lugs on the periphery of said band to prevent said band from normally slipping through said eyelets, and for providing additional traction to said wheel.

HARRY H. FULLER.